US011982918B2

(12) United States Patent
Callens et al.

(10) Patent No.: US 11,982,918 B2
(45) Date of Patent: May 14, 2024

(54) APPARATUS AND METHOD FOR REFLECTIVE IMAGE DISPLAY WITH DIELECTRIC LAYER

(71) Applicant: WUXI CLEARINK LIMITED, Jiangsu (CN)

(72) Inventors: Michiel Koen Callens, Jabbeke (BE); Robert J. Fleming, San Jose, CA (US); Thomas Johansson, Coquitlam (CA); Graham Beales, Vancouver (CA); Steven Gou, Vancouver (CA)

(73) Assignee: WUXI CLEARINK LIMITED, Wuxi (CN)

( * ) Notice: Subject to any disclaimer, the term of this patent is extended or adjusted under 35 U.S.C. 154(b) by 814 days.

(21) Appl. No.: 17/050,369

(22) PCT Filed: Apr. 24, 2019

(86) PCT No.: PCT/US2019/028894
§ 371 (c)(1),
(2) Date: Oct. 23, 2020

(87) PCT Pub. No.: WO2019/209936
PCT Pub. Date: Oct. 31, 2019

(65) Prior Publication Data
US 2021/0116772 A1     Apr. 22, 2021

Related U.S. Application Data (60) Provisional application No. 62/662,727, filed on Apr. 25, 2018.

(51) Int. Cl.
*G02F 1/1676* (2019.01)
*G02F 1/1343* (2006.01)
*G02F 1/167* (2019.01)

(52) U.S. Cl.
CPC .......... *G02F 1/167* (2013.01); *G02F 1/13439* (2013.01); *G02F 1/1676* (2019.01)

(58) Field of Classification Search
CPC ..... G02B 5/126; G02B 26/02; G02F 1/13439; G02F 1/1676; G02F 1/1677; G02F 1/315
See application file for complete search history.

(56) References Cited

U.S. PATENT DOCUMENTS 7,202,185 B1 * 4/2007 Hausmann ............ C23C 16/402
257/E21.279
2010/0069904 A1  3/2010 Cunningham
(Continued)

FOREIGN PATENT DOCUMENTS

| CN | 103903973 A | 7/2014 |
| CN | 105789032 A | 7/2016 |

(Continued)

OTHER PUBLICATIONS

Chinese Office Action dated Dec. 1, 2022 as received in application No. 201980028133.0.
(Continued)

*Primary Examiner* — Joseph P Martinez
(74) *Attorney, Agent, or Firm* — Maschoff Brennan (57) ABSTRACT

Semi-retro-reflective total internal reflection-based image displays may be equipped with at least one dielectric layer. The at least one dielectric layer may be deposited on one or more of a front electrode layer, rear electrode layer or pixel walls. This may lead to displays with enhanced brightness, improved electrophoretic particle responsiveness, improved grayscale and chemical stability in the presence of an electrophoretic medium, and improved resistance to high electric fields and high temperatures. In one embodiment, a total internal reflection-based image display comprises a dielectric layer formed by one or more of methods molecular layer deposition, atomic layer deposition, chemical vapor
(Continued)

deposition, plasma enhance chemical vapor deposition, spin coating or slot die coating. In another embodiment, a total internal reflection-based image display comprises at least one dielectric layer and at least one surface modification layer.

18 Claims, 4 Drawing Sheets

(56) References Cited

U.S. PATENT DOCUMENTS

| | | |
|---|---|---|
| 2010/0231116 A1 | 9/2010 | Ochi et al. |
| 2012/0056161 A1 | 3/2012 | Avouris et al. |
| 2016/0349592 A1 | 12/2016 | Goulding et al. |
| 2017/0160444 A1 | 6/2017 | Sadlik et al. |
| 2018/0031941 A1* | 2/2018 | Goulding ............ G02F 1/16756 |
| 2018/0173074 A1 | 6/2018 | Zhang |

FOREIGN PATENT DOCUMENTS

| | | |
|---|---|---|
| CN | 107924101 A | 4/2018 |
| WO | 2017040628 A1 | 3/2017 |
| WO | 2017040628 A1 | 9/2017 |
| WO | 2017205312 A1 | 11/2017 |

OTHER PUBLICATIONS

Japanese Notice of Reasons for Refusal dated Dec. 27, 2022 as received in application No. 2020-559543.
CN Office Action dated May 26, 2023 as received in Application No. 201980028133.0.
European Search Report dated Dec. 9, 2021 as received in application No. 19793408.6.
Chinese Office Action dated Mar. 2, 2022 as received in application No. 201980028133.0.
EP Office Action dated Nov. 27, 2023 as received in Application No. 19793408.6.

* cited by examiner

APPARATUS AND METHOD FOR REFLECTIVE IMAGE DISPLAY WITH DIELECTRIC LAYER

CROSS-REFERENCE TO RELATED APPLICATIONS

The present application is a continuation of International Patent Application No. PCT/US2019/028894, filed Apr. 24, 2019, which claims the benefit of U.S. Provisional Application Ser. No. 62/662,727, filed Apr. 25, 2018 (titled "Apparatus and Method for Reflective Image Display with Dielectric Layer"), both of which are incorporated herein in by reference in their entirety for all purposes.

FIELD

The disclosure is directed to an apparatus for reflective image displays. In one embodiment, the disclosure relates to a reflective image display comprising a dielectric layer located on the surface of at least one electrode formed by one or more of methods of atomic layer deposition, plasma-enhanced atomic layer deposition, spatial atomic layer deposition, chemical vapor deposition, plasma-enhanced chemical vapor deposition, molecular vapor deposition, sol-gel deposition, physical vapor deposition, sputtering, spin coating or slot die coating.

BACKGROUND

Dielectric materials are widely used in a broad range of industrial applications. Dielectric coatings typically have, for example, resistance to high temperatures, radiation, oxidative degradation along with abrasion, friction and other various forms of physical wear. Additionally, dielectric coatings typically provide resistance to solvents and other chemicals along with exhibiting excellent electrical insulating properties. Dielectric coatings can have a variety of surface chemistries that can be controlled by changing the deposition conditions. Dielectric compounds can be organic or inorganic in type. Some of the more common inorganic dielectric materials are silicon nitride and silicon dioxide commonly used in integrated chips. Organic dielectric materials are typically polymers such as polyimides, fluoropolymers, polynorbornenes and hydrocarbon-based polymers lacking polar groups. Dielectric materials can be used in multilayer systems that combine characteristics of the different materials to form a hybrid material that has the desired characteristics.

Dielectric materials may be used in total internal reflection (TIR) based image displays. Prior art total internal reflection (TIR) based displays include, among others, a transparent high refractive index front sheet in contact with a low refractive index fluid. The front sheet and fluid may have different refractive indices that may be characterized by a critical angle $\theta_c$. The critical angle characterizes the interface between the surface of the transparent front sheet (with refractive index $\eta_1$) and the low refractive index fluid (with refractive index $\eta_3$). Light rays incident upon the interface at angles less than $\theta_c$ may be transmitted through the interface. Light rays incident upon the interface at angles greater than $\theta_c$ may undergo TIR at the interface. A small critical angle (e.g., less than about 50°) is preferred at the TIR interface since this affords a large range of angles over which TIR may occur. It may be prudent to have a fluid medium with preferably as small a refractive index ($\eta_3$) as possible and to have a transparent front sheet composed of a material having a refractive index ($\eta_1$) preferably as large as possible. The critical angle, $\theta_c$, is calculated by the following equation (Eq. 1):

$$\theta_c = \sin^{-1}\left(\frac{\eta_3}{\eta_1}\right) \qquad (1)$$

Prior art TIR-based reflective image displays further include electrophoretically mobile, light absorbing particles. The electrophoretically mobile particles move in response to a bias between two opposing electrodes. When particles are moved by a voltage bias source to the surface of the front sheet they may enter the evanescent wave region (depth of about 1 micron) and frustrate TIR. The evanescent wave region depth may vary due to such factors as wavelength of incident light, angle of incident light and the refractive indices of the front sheet and the medium. Incident light may be absorbed by the electrophoretically mobile particles to create a dark state observed by the viewer. Under such conditions, the display surface may appear dark, black or any color exhibited by the particles to the viewer. When the particles are moved out of the evanescent wave region (e.g., by reverse biasing), light may be reflected by TIR. This creates a white or bright state that may be observed by the viewer. An array of pixelated electrodes may be used to drive the particles into and out of the evanescent wave region to form combinations of white and dark states. This may be used to create images or to convey information to the viewer.

Figure 1A:
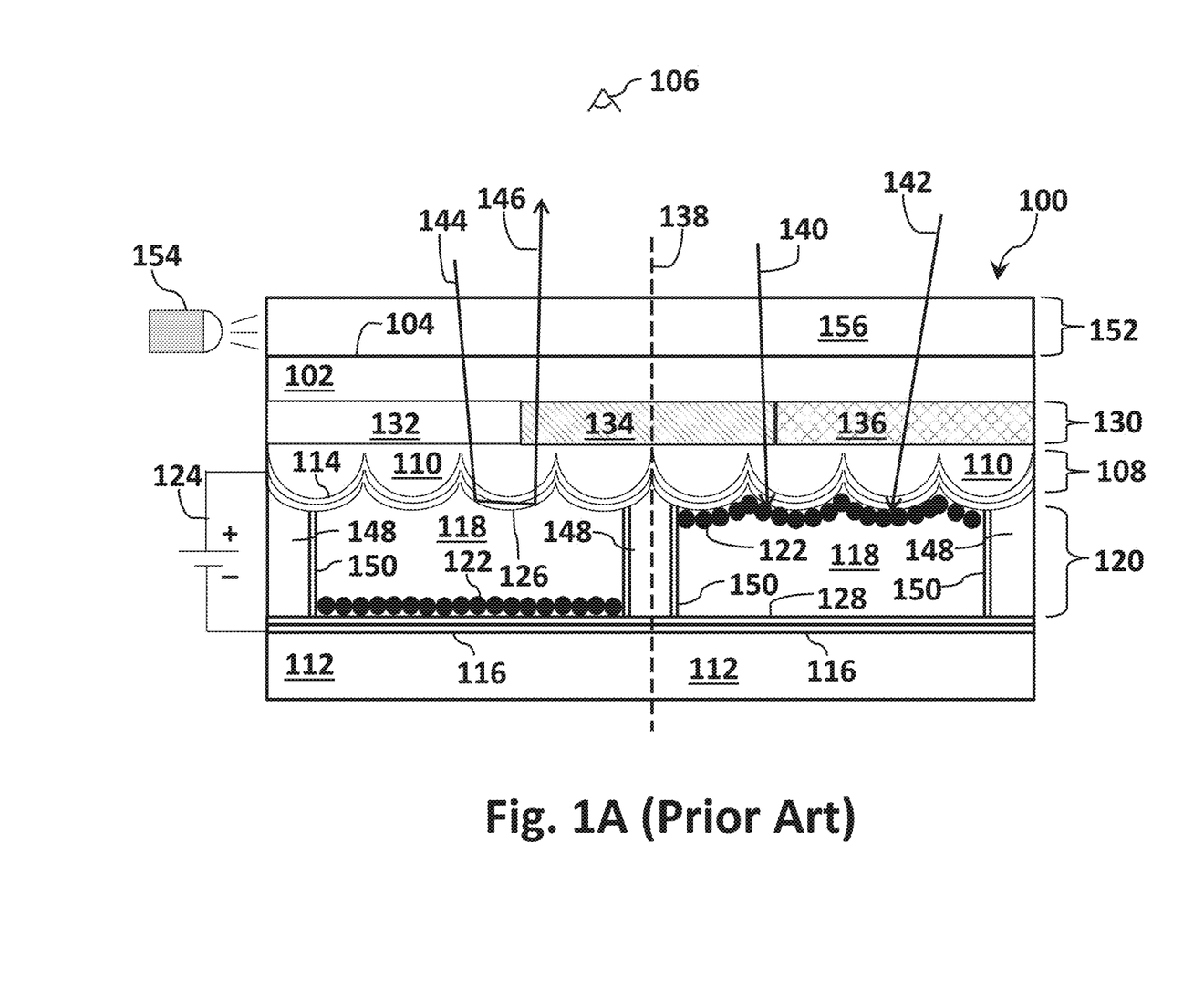
FIG. 1A schematically illustrates a cross-section of a portion of a conventional TIR-based display.

The front sheet in prior art TIR-based displays typically includes a plurality of higher refractive index close-packed convex structures on the inward side facing the lower refractive index medium and electrophoretically mobile particles (i.e., the surface of the front sheet which faces away from the viewer). The convex structures may be hemispherically-shaped but other shapes may be used. The convex structures may have circular symmetry. A prior art TIR-based display 100 is illustrated in FIG. 1A. Display 100 is shown with a transparent front sheet 102 with outer surface 104 facing viewer 106. Display 100 further comprises a layer of a plurality 108 of individual hemispherical protrusions 110, rear support sheet 112, a transparent front electrode 114 on the surface of the plurality of hemispherical protrusions 108 and a rear electrode 116. Rear electrode 116 may comprise a passive matrix array of electrodes, a thin film transistor (TFT) array or a direct drive array of electrodes. The rear array of electrodes may be formed in an array of pixels. FIG. 1A also shows low refractive index fluid 118 which is disposed within cavity or gap 120 formed between the surface of protrusions 108 and rear support sheet 112. Fluid 118 contains a plurality of light absorbing electrophoretically mobile particles 122. Display 100 may further include voltage source 124 capable of creating a bias across cavity 120. Display 100 may further comprise one or more dielectric layers 126, 128 on front electrode 114 or rear electrode 116 or on both the front and rear electrodes, and a color filter layer 130. In FIG. 1, color filter layer 130 is located between sheet 102 and convex protrusion layer 108. Color filter layer 130 may also be located on the outer surface 104 of sheet 102 facing viewer 106. Adding a color filter array (CFA) layer over the front surface of the display is a conventional method to transform a black and white reflective display into a full color display.

A color filter layer typically comprises one or more sub-pixel color filters. Sub-pixel color filters may comprise one or more colors of red, green, blue, white, black, clear, cyan, magenta or yellow. The sub-pixel color filters are typically grouped into two or more colors and arrayed in a repeatable pattern. The repeatable pattern makes up a pixel such as, for example, RGB (red-green-blue) sub-pixels or RGBW (red-green-blue-white) sub-pixels. For illustrative purposes, a portion of prior art display 100 in FIG. 1A comprises color filter layer 130, further comprising a red sub-pixel color filter 132, a green sub-pixel color filter 134 and a blue sub-pixel color filter 136. Other sub-pixel color filter combinations may be used.

When particles 122 are electrophoretically moved towards front electrode 114 and into the evanescent wave region, they may frustrate TIR. This is shown to the right of dotted line 138 and is illustrated by incident light rays 140 and 142 being absorbed by particles 122. This area of the display, such as at a pixel, may appear as a dark, colored or grey state to viewer 106.

When particles are moved away from front sheet 102 and out of the evanescent wave region towards rear electrode 116 (as shown to the left of dotted line 138) incident light rays may be totally internally reflected at the interface of the surface of dielectric layer 126 on convex protrusion array 108 and medium 118. This is represented by incident light ray 144, which is totally internally reflected and exits the display towards viewer 106 as reflected light ray 146. The display pixel may appear white, bright, colored or grey to the viewer.

Conventional TIR-based display 100 may further comprise sidewalls 148 that bridge front sheet 102 to rear sheet 112. Sidewalls may comprise at least one dielectric layer 150. Display 100 may further comprise a directional front light system 152. Front light system 152 may comprise light source 154 and waveguide 156.

Figure 1B:
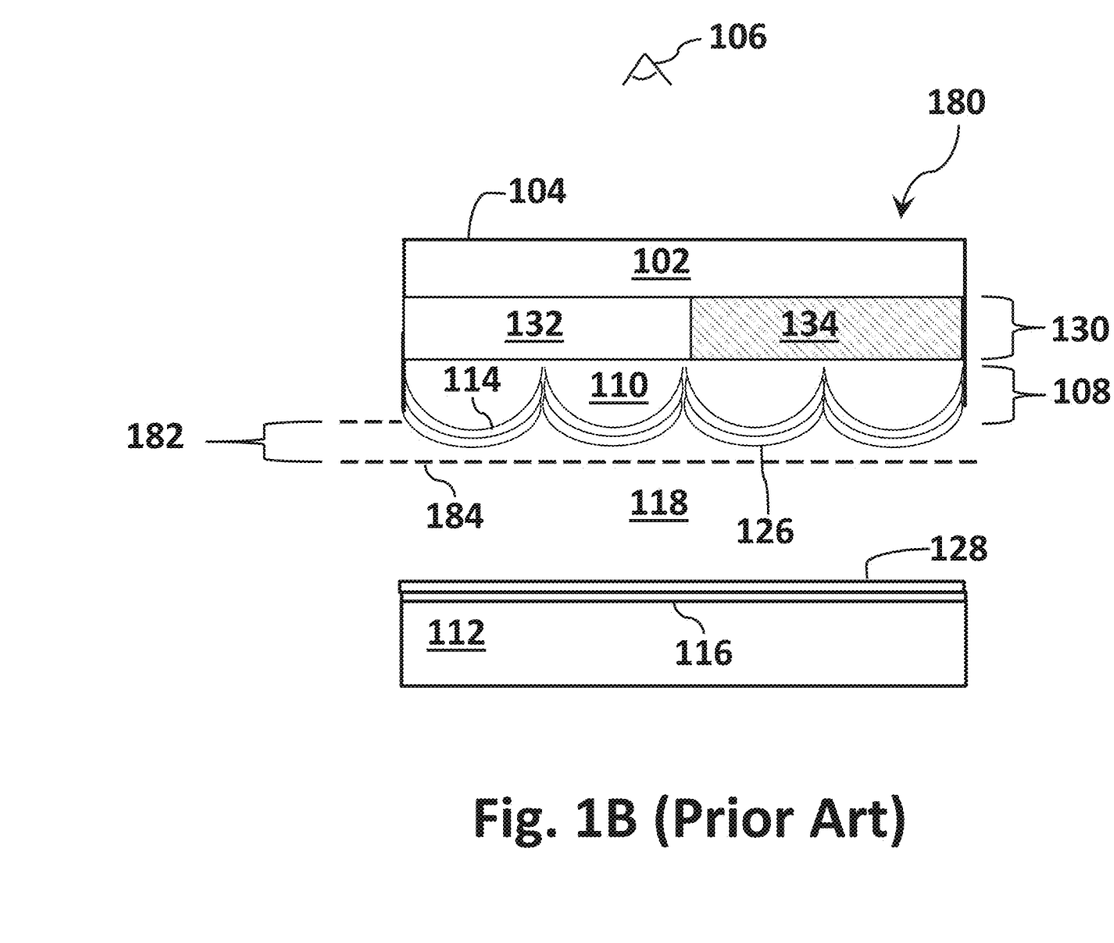
FIG. 1B schematically illustrates a cross-section of a portion of a conventional TIR-based display showing the approximate location of the evanescent wave region.

FIG. 1B schematically illustrates a cross-section of a portion of a conventional TIR-based display showing the approximate location of the evanescent wave region. Drawing 180 in FIG. 1B is a close-up view of a portion of drawing 100 in FIG. 1A. The evanescent wave region 182 is located at the interface of dielectric layer 126 and medium 118. This location is illustrated in drawing 180, wherein the evanescent wave region 182 is located approximately between dotted line 184 and dielectric layer 126. It should be noted that the evanescent wave region 182 is an illustration and its depth or reach may vary according to the design of the display and the materials of construction used. The evanescent wave is typically conformal to the surface of layer of protrusions 108. The depth of the evanescent wave region is about 1 micrometer, as previously mentioned.

Figure 1C:
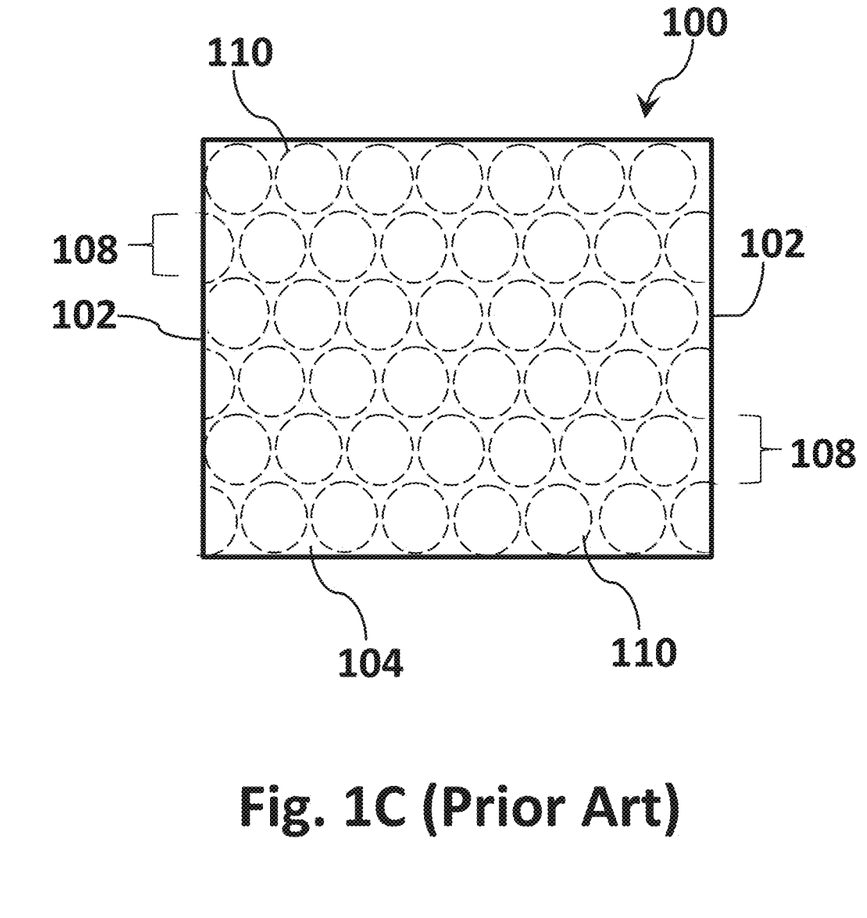
FIG. 1C schematically illustrates a cross-section of a portion of an overhead view of a conventional TIR-based display.

FIG. 1C schematically illustrates an overhead view of a sheet of convex protrusions. The view in FIG. 1C looks down on surface 104 of sheet 102. This is the view of viewer 106 in FIGS. 1A-B. Convex protrusions 110 are arranged in a layer 108 on the opposite side of sheet 102 and are depicted as dotted line circles representing hemispheres arranged into a close packed array. Other arrangements of convex protrusions 110 may be possible. Protrusions 110 may be arranged in non-close packed rows.

In some embodiments, display 100 in FIG. 1A may further comprise an ambient light sensor (ALS), frame detection system (FDS) or a light controller or a combination thereof.

Pulse and DC (direct current) driving schemes may be utilized to derive and maintain desired optical state (i.e. gray state) levels within the pixels of the display. The driving schemes may comprise one or more of variable applied positive or negative voltages, variable voltage ON times (i.e. ON state pulse widths) and variable voltage OFF times (i.e. OFF state pulse widths).

In order to achieve uniform dielectric properties over the surface of an array of convex protrusions, a dielectric layer may be deposited in a substantially uniform and conformal manner.

BRIEF DESCRIPTION OF DRAWINGS

These and other embodiments of the disclosure will be discussed with reference to the following exemplary and non-limiting illustrations, in which like elements are numbered similarly, and where.

DETAILED DESCRIPTION

Embodiments described herein illustrate methods to deposit dielectric materials in TIR-based reflective image displays that may lead to thin conformal coatings with substantially controlled thickness, resistivity, resistance, permittivity, chemical compatibility/resistance, surface energy, surface charge, minimal pin holes and improved electrical properties. The one or more dielectric layers 126, 128 may be used to protect one or both of the front electrode layer 114 and/or rear electrode layer 116. In some embodiments, the one or more dielectric layers may be deposited on walls 140. In some embodiments, the one or more dielectric layers on front electrode layer 114 may comprise a different composition than the dielectric layer on rear electrode layer 116. The dielectric on the front electrode layer 114 may comprise more than one layer. For example, the dielectric on front electrode 114 may comprise one or more inorganic-based dielectric layers and one or more organic-based dielectric layers or a combination of one or more inorganic dielectric layers and one or more organic dielectric layers. The dielectric on the rear electrode layer 116 may comprise more than one layer. For example, the dielectric on rear electrode 116 may comprise one or more inorganic-based dielectric layers and one or more organic-based dielectric layers. In some embodiments, the one or more dielectric layers 126, 128 may be used to protect one or more pixel walls in display 100. The dielectric layers may be substantially uniform, conforming, continuous and substantially free of surface defects. The one or more dielectric layers may be at least about 0.05 nm in thickness or more. In some embodiments, the dielectric layer thickness may be in the range of about 1-300 nm. In other embodiments, the dielectric layer thickness may be in the range of about 1-200 nm. In still other embodiments, the dielectric layer thickness may be about 1-100 nm. In still other embodiments, the dielectric layer thickness may be about 1-50 nm. In still other embodiments, the dielectric layer thickness may be about 1-20 nm. In still other embodiments, the dielectric layer thickness may be about 1-10 nm.

In some embodiments, the one or more dielectric layers in TIR-based image displays may not comprise a pin hole. In some embodiments, the one or more dielectric layers may comprise at least one pin hole. The dielectric layer may define a conformal coating and may be free of pin holes or may have minimal pin holes. The dielectric layer may also be a structured layer. The dielectric layer may also act as a barrier layer to prevent moisture or gas ingress. The dielectric layers may have a high or low dielectric constant. In some embodiments, the dielectric layers may have a dielectric constant in the range of about 1-30. In other embodiments, the dielectric layers may have a dielectric constant in the range of about 1-15. In some embodiments, the dielectric layers may further comprise a surface modification layer. The surface modification layer may be used to control the surface properties of the dielectric layers.

Dielectric materials used in TIR-based image displays may be inorganic in type. The most common inorganic dielectric materials are $Si_3N_4$ and $SiO_2$ commonly used in integrated chips. The dielectric layer may be one or more of SiN, $SiN_x$ or SiON. The dielectric layer may be $AlO_x$ or $Al_2O_3$. Wherein x is between about 1 and 3. The dielectric layer may be a ceramic.

Dielectric materials used in TIR-based image displays may be organic in type. Organic dielectric materials are typically polymers such as polyimides, fluoropolymers, polynorbornenes and hydrocarbon-based polymers lacking polar groups. The dielectric layers may be a polymer or a combination of polymers. Dielectric layers 126, 128 may comprise one or more of the following polyimide-based dielectrics Dalton DL-5260T, TC-139, DL-2193, Nissan SE-150, SE-410, SE-610, SE-3140N, SE-3310, SE-3510, SE-5661, SE-5811, SE-6414, SE-6514, SE-7492, SE-7992 or JSR AL-1054, AL-3046, AL22620, AL16301, AL60720. The dielectric layers may be combinations of polymers, metal oxides and ceramics. Dielectric layers 126, 128 may comprise Parylene C, Parylene N, Parylene F, Parylene HT or Parylene HTX. Other inorganic or organic dielectric materials or combinations thereof may also be used for the dielectric layers. One or more of the dielectric layers may be PVD, CVD, PECVD or sputter coated. One or more of dielectric layers 126, 128 may be a solution coated polymer, flexo-printed polymer dielectric, vapor deposited dielectric, spin coated polymer dielectric, slot die coated polymer dielectric or sputter deposited dielectric. Dielectric layer 128 may be conformal to electrode structures or could be used to planarize the electrode structures on rear electrode 116.

In an exemplary embodiment, the one or more dielectric layers on the front electrode or the one or more dielectric layers on the rear electrode in a TIR-based image display may be deposited by the method of atomic layer deposition (ALD), plasma enhanced atomic layer deposition (PEALD) or molecular vapor deposition (MVD). In an exemplary embodiment, the one or more dielectric layers on the front electrode or the one or more dielectric layers on the rear electrode in a TIR-based image display may be deposited by the method of thermal or plasma enhanced atomic layer deposition (ALD). ALD may also be referred to as atomic layer epitaxy (ALE), atomic layer growth (ALG), molecular layer epitaxy (MLE), molecular layering (ML) and atomic layer CVD (ALCVD). ALD is a deposition method capable of forming uniform, conformal coatings with thickness controlled at the atomic level onto structured, high aspect ratio surfaces, such as surface 108.

In an exemplary embodiment, the one or more dielectric layers on the front electrode or the one or more dielectric layers on the rear electrode in a TIR-based image display deposited by the method of ALD may comprise a metal oxide. The metal oxide may include one or more of $Al_2O_3$, $AlO_x$, $BaO_x$, CaO, CuO, $Er_2O_3$, $Ga_2O_3$, $HfO_2$, $HfO_x$, InZnO, InGaZnO, $La_2O_3$, MgO, $MoO_x$, $Nb_2O_5$, $NbO_x$, NiO, $Sc_2O_3$, $SiO_2$, $SnO_2$, $SnO_x$, $SrO_x$, $Ta_2O_5$, $TaO_x$, $TiO_2$, $TiO_x$, $VO_x$, $Y_2O_3$, $YO_x$, $Yb_2O_3$, $ZnSnO_x$, ZnO or $ZrO_2$ or a combination thereof (where x and y are between about 1 and 3).

In an exemplary embodiment, the one or more dielectric layers on the front electrode or the one or more dielectric layers on the rear electrode in a TIR-based image display deposited by the method of ALD may comprise one or more of metal nitrides AlN, BN, GaN, SiN, $SiN_x$, TaN, $TaN_x$, TiAlN, TiN, WN or $TiN_x$ or a combination thereof (Wherein x is between about 1 and 3).

In an exemplary embodiment, the one or more dielectric layers on the front electrode or the one or more dielectric layers on the rear electrode in a TIR-based image display deposited by the method of ALD may comprise a metal carbide. The metal carbides may include TaC or TiC.

In an exemplary embodiment, the one or more dielectric layers on the front electrode or the one or more dielectric layers on the rear electrode in a TIR-based image display deposited by the method of ALD may comprise a metal sulfide. The metal sulfide may include one or more of ZnS or SrS or a combination thereof.

In an exemplary embodiment, the one or more dielectric layers on the front electrode or the one or more dielectric layers on the rear electrode in a TIR-based image display deposited by the method of ALD may comprise a metal fluoride. The metal fluoride may include one or more of $CaF_2$, $LaF_3$, $MgF_2$ or $SrF_2$ or a combination thereof.

In an exemplary embodiment, the one or more dielectric layers on the front electrode or the one or more dielectric layers on the rear electrode in a TIR-based image display deposited by the method of ALD may comprise a polymer. In an exemplary embodiment, the one or more dielectric layers on the front electrode or the one or more dielectric layers on the rear electrode in a TIR-based image display deposited by the method of ALD may comprise a biomaterial such as hydroxyapatite $Ca_{10}(PO_4)_6(OH)_2$.

In an exemplary embodiment, the one or more dielectric layers on the front electrode or the one or more dielectric layers on the rear electrode in a TIR-based image display deposited by the method of ALD may comprise a mixed structure comprising two or more of a metal oxide, metal nitride, metal carbide, metal sulfide, metal fluoride, biomaterial or a polymer.

In an exemplary embodiment, ALD coatings of dielectrics in a TIR-based image display may be coated on a roll-to-roll method, batch method or spatial ALD method.

The data in the following table illustrates the advantage of ALD over sputtering. Sputtering is a well-known physical vapor deposition method of forming thin films on surfaces. The method of ALD is more capable of depositing thinner and more uniform layers than sputtering. The following table lists the thickness of a $SiO_2$ dielectric layer onto a transparent conductive film of indium tin oxide (ITO) in a TIR-based image display as illustrated in FIG. 1A. Sputtering was used to coat SiO2 thickness of about 100 nm and 50 nm. The white state reflectance (%) was measured at about 71% for 100 nm and 81% at 50 nm thickness (The percentage reflectance is measured relative to a white, diffuse 100% reflectance standard by Labsphere, Inc., North Sutton, NH, USA). The dark or black state reflectance was measured at about 12% for 100 nm thickness and about 13% for 50 nm thickness of $SiO_2$. This resulted in a contrast ratio (white state reflectance/black state reflectance) of about 5.9 for 100 nm and about 6.2 for 50 nm thickness of SiO$_2$. ALD was used to coat SiO$_2$ dielectric layers of 5, 12 and 25 nm. In all cases the white state reflectance was about 80-85%. The dark state reflectance decreased from about 4% at 25 nm thickness down to about 1.7-2% at 5 nm SiO$_2$ thickness. As a result the contrast ratio increased greatly for ALD coated samples, compared to sputtering, from about 20 and 25 nm up to a ratio of about 40-50 at a thickness of about 5 nm.

| Dielectric Thickness (nm) | Deposition Method | White Reflectance (%) | Black Reflectance (%) | Contrast Ratio (W/B) |
| --- | --- | --- | --- | --- |
| 100 | Sputter | 71 | 12 | 5.9 |
| 50 | Sputter | 81 | 13 | 6.2 |
| 25 | ALD | 80-85 | 4 | 20-21 |
| 12 | ALD | 80-85 | 2-3 | 27-43 |
| 5 | ALD | 80-85 | 1.7-2 | 40-50 |

The one or more dielectric layers on the front electrode, rear electrode or pixel walls in a TIR-based image display may be deposited by the method of molecular layer deposition (MLD). MLD may be used to deposit polymer-based, inorganic-based and hybrid polymer-inorganic-based dielectric layers in TIR-based image displays. Polymers may, for example, include polyimides or polyamides. MLD may be used to deposit materials comprising one or more of metal oxides such as Al$_2$O$_3$, AlO$_x$, BaO$_x$, CaO, CuO, Er$_2$O$_3$, Ga$_2$O$_3$, HfO$_2$, HfO$_x$, InZnO, InGaZnO, La$_2$O$_3$, MgO, MoO$_x$, Nb$_2$O$_5$, NbO$_x$, NiO, Sc$_2$O$_3$, SiO$_2$, SnO$_2$, SnO$_x$, SrO$_x$, Ta$_2$O$_5$, TaO$_x$, TiO$_2$, TiO$_x$, VO$_x$, Y$_2$O$_3$, YO$_x$, Yb$_2$O$_3$, ZnSnO$_x$, ZnO or ZrO$_2$; metal nitrides such as AlN, BN, GaN, SiN, SiN$_x$, TaN, TaN$_x$, TiAlN, TiN, WN or TiN$_x$; metal carbides such as TaC, TiC; metal sulfides such as ZnS, SrS; metal fluorides such as CaF$_2$, LaF$_3$, MgF$_2$, SrF$_2$; biomaterials such as Ca$_{10}$(PO$_4$)$_6$(OH)$_2$ or combinations thereof (Wherein x is between about 1 and 3). In an exemplary embodiment, the one or more dielectric layers in a TIR-based image display deposited by the method of MLD may comprise a mixed structure comprising two or more of a metal oxide, metal nitride, metal carbide, metal sulfide, metal fluoride, biomaterial or an organic or inorganic polymer.

The one or more dielectric layers on the front electrode or the one or more dielectric layers on the rear electrode or pixel walls in a TIR-based image display may be deposited by one or more methods of chemical vapor deposition (CVD), molecular vapor deposition (MVD), plasma enhanced atomic layer deposition (PEALD) or plasma-enhanced chemical vapor deposition (PECVD). In an exemplary embodiment, one or more dielectric layers comprising SiO$_2$ may be deposited using CVD, MVD, MLD, PEALD or PECVD in a TIR-based image display. CVD, MVD, MLD, PEALD or PECVD may be used to deposit materials comprising one or more of metal oxides such as Al$_2$O$_3$, AlO$_x$, BaO$_x$, CaO, CuO, Er$_2$O$_3$, Ga$_2$O$_3$, HfO$_2$, HfO$_x$, InZnO, InGaZnO, La$_2$O$_3$, MgO, MoO$_x$, Nb$_2$O$_5$, NbO$_x$, NiO, Sc$_2$O$_3$, SiO$_2$, SnO$_2$, SnO$_x$, SrO$_x$, Ta$_2$O$_5$, TaO$_x$, TiO$_2$, TiO$_x$, VO$_x$, Y$_2$O$_3$, YO$_x$, Yb$_2$O$_3$, ZnSnO$_x$, ZnO or ZrO$_2$; metal nitrides such as AlN, BN, GaN, SiN, SiN$_x$, TaN, TaN$_x$, TiAlN, TiN, WN or TiN$_x$; metal carbides such as TaC, TiC; metal sulfides such as ZnS, SrS; metal fluorides such as CaF$_2$, LaF$_3$, MgF$_2$, SrF$_2$; biomaterials such as Ca$_{10}$(PO$_4$)$_6$(OH)$_2$ or combinations thereof (Wherein x and y are between about 1 and 3). In an exemplary embodiment, the one or more dielectric layers in a TIR-based image display deposited by the method of CVD, MVD, MLD, PEALD or PECVD may comprise a mixed structure comprising two or more of a metal oxide, metal nitride, metal carbide, metal sulfide, metal fluoride, biomaterial or an organic or inorganic polymer.

The one or more dielectric layers on the front electrode or the one or more dielectric layers on the rear electrode or pixel walls in a TIR-based image display may be deposited by the method of sputtering. In an exemplary embodiment, one or more dielectric layers comprising SiO$_2$ may be deposited using sputtering in a TIR-based image display. Sputtering may be used to deposit materials comprising one or more of metal oxides such as Al$_2$O$_3$, AlO$_x$, BaO$_x$, CaO, CuO, Er$_2$O$_3$, Ga$_2$O$_3$, HfO$_2$, HfO$_x$, InZnO, InGaZnO, La$_2$O$_3$, MgO, MoO$_x$, Nb$_2$O$_5$, NbO$_x$, NiO, Sc$_2$O$_3$, SiO$_2$, SnO$_2$, SnO$_x$, SrO$_x$, Ta$_2$O$_5$, TaO$_x$, TiO$_2$, TiO$_x$, VO$_x$, Y$_2$O$_3$, YO$_x$, Yb$_2$O$_3$, ZnSnO$_x$, ZnO or ZrO$_2$; metal nitrides such as AlN, BN, GaN, SiN, SiN$_x$, TaN, TaN$_x$, TiAlN, TiN, WN or TiN$_x$; metal carbides such as TaC, TiC; metal sulfides such as ZnS, SrS; metal fluorides such as CaF$_2$, LaF$_3$, MgF$_2$, SrF$_2$; biomaterials such as Ca$_{10}$(PO$_4$)$_6$(OH)$_2$ or combinations thereof (Wherein x is between about 1 and 3). In an exemplary embodiment, the one or more dielectric layers in a TIR-based image display deposited by the method of sputtering may comprise a mixed structure comprising two or more of a metal oxide, metal nitride, metal carbide, metal sulfide, metal fluoride, biomaterial or an organic or inorganic polymer.

The one or more dielectric layers on the front electrode, rear electrode or pixel walls in a TIR-based image display may comprise two or more sub-layers. The sub-layers may each comprise a different material. The sub-layers of different materials may be deposited using one or more of the methods of sputtering, ALD, PEALD, MVD, MLD, CVD, PECVD, spin coating or slot die coating. Sub-layers comprising the same or different materials may be deposited by a combination of two or more methods of sputtering, ALD, PEALD, MVD, MLD, CVD, PECVD, spin coating or slot die coating.

In one embodiment, one or more dielectric coatings on the front or rear electrode layers in a TIR-based image display may include a first sub-layer comprising about 0.5-100 nm thick sputtered Al$_y$O$_x$ (wherein x and y are between about 1 and 3) and a second sub-layer on top comprising about 0.5-100 nm thick layer of sputtered SiO$_2$.

In one embodiment, one or more dielectric coatings on the front or rear electrode layers in a TIR-based image display may include a first sub-layer comprising about 0.5-50 nm thick of ALD deposited AlO$_x$ and a second sub-layer on top comprising about 0.5-10 nm thick layer of ALD deposited SiO$_2$. In other embodiments, one or more dielectric coatings on the front or rear electrode layers in a TIR-based image display may include a first sub-layer comprising about 0.5-20 nm thick of ALD deposited AlO$_x$ and a second sub-layer on top comprising about 0.5-20 nm thick layer of ALD deposited SiO$_2$.

Figure 2:
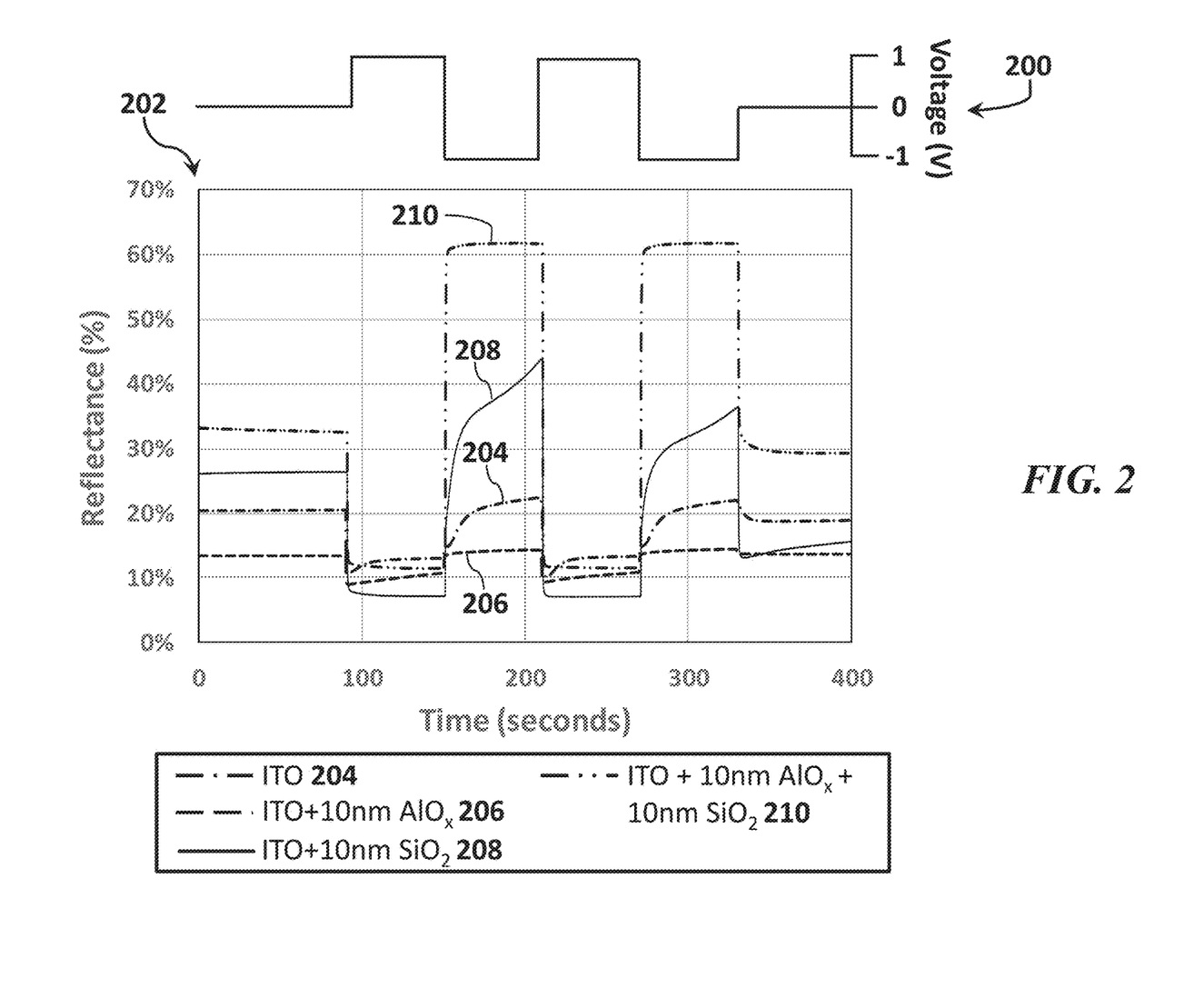
FIG. 2 is a graphical representation of a TIR-based image display with various dielectric layer combinations during switching.

FIG. 2 is a graphical representation of a TIR-based image display with various dielectric layer combinations during switching. In FIG. 2, driving voltage profile 200 is illustrated where the x-axis is the bias driving time in seconds and the y-axis on the right side is the driving voltage applied to the rear electrode. The front electrode, which is located on the surface of the convex protrusions, is connected to the ground. The y-axis on the left side in plot 202 is the optical reflectance (%). The % reflectance (The % reflectance is measured relative to a white, diffuse 100% reflectance standard by Labsphere, Inc., North Sutton, NH, USA) of each sample over time was recorded continuously while the voltage on the rear electrode was switched in a stepwise manner from 0V to +1V, to 0V, to −1V, and back to 0V (This is one complete cycle) to electrophoretically move particles (e.g. particles 122 in display 100 in FIG. 1A) between the front and rear electrodes in a low refractive index, fluorocarbon-based medium. Each voltage step was held for 60 seconds.

Four samples were tested with each having a different dielectric layer composition. The first sample labeled "ITO" 204 denoted by a dash-dot-dash line (- • -) in FIG. 2 is the control and does not comprise a dielectric layer on top of the ITO-based front electrode layer. The second sample labeled "ITO+10 nm $AlO_x$," 206 denoted by a dashed line (- -) comprises a ~10 nm thick dielectric layer of aluminum oxide ($AlO_x$) on top of the ITO-based front electrode. The third sample labeled "ITO+10 nm $SiO_2$" 208 denoted by a solid line (-) in FIG. 2 comprises a dielectric layer of $SiO_2$ of about 10 nm on top of the ITO-based front electrode. Lastly, the fourth sample labeled "ITO+10 nm $AlO_x$+10 nm $SiO_2$" 210 denoted by a dash-dot-dot-dash line (- • • -) comprises a dielectric layer of about 10 nm of $AlO_x$ on top of the ITO-based front electrode followed by a layer of about 10 nm of $SiO_2$ on top of the $AlO_x$ layer (Wherein x is about 1.5 (i.e., $Al_2O_3$)).

Applying +1V at the rear electrode, the positively charged particles are attracted to the front electrode near the evanescent wave region. For all samples 204-210, % reflectance drops to about 8-12% as the particles are attracted to the front electrode layer where they may frustrate TIR and create a dark state as shown in the plot in FIG. 2. Very little difference is observed between the TIR-based displays with the various combinations of dielectric layers. This state is held at 1V for 60 sec.

A step potential change to −1V is then applied to displays 204-210. The particles are then attracted towards the rear electrode and out of the evanescent wave region. This creates a bright state of the display. Clear differences are observed in the speed by which the particles switch and the magnitude of the % reflectance. Sample 210 with a layer of $SiO_2$ on top of $AlO_x$ reaches a near maximum % reflectance of about 62% nearly instantaneously once −1V is applied. This is followed by sample 208 that reaches a maximum of about 45% reflectance followed by sample 204 at about 22% reflectance followed lastly by sample 206 with an $AlO_x$ layer on top of ITO of about 14%. The % reflectance is in the order of sample 210>208>204>206.

The applied voltage is then reversed to +1V where all displays reach a dark state reflectance of about 8-12% as previously observed. One last time in the plot in FIG. 2, the voltage is then stepped to −1V. The same order is observed in the % reflectance as shown previously of 210>208>204>206. The best combination observed is ~10 nm layer of $AlO_x$ on top of ITO followed by an outer layer of ~10 nm of $SiO_2$ on top of the $AlO_x$ layer. The second best sample observed is when there is an $SiO_2$ layer on top of the ITO layer 208. Beneficial switching speed and % reflectance properties are observed when the outer $SiO_2$ layer includes an $AlO_x$ layer sandwiched between the ITO and $SiO_2$ layers.

In one embodiment, one or more dielectric coatings on the front or rear electrode layers in a TIR-based image display may include a first sub-layer comprising about 0.5-100 nm thick of ALD deposited $AlO_x$ and a second sub-layer on top comprising about 0.5-200 nm thick layer of CVD deposited $SiN_x$. In one embodiment, one or more dielectric coatings on the front or rear electrode layers in a TIR-based image display may include a first sub-layer comprising about 0.5-50 nm thick of ALD deposited $AlO_x$ and a second sub-layer on top comprising about 0.5-100 nm thick layer of CVD deposited $SiN_x$. In other embodiments, one or more dielectric coatings on the front or rear electrode layers in a TIR-based image display may include a first sub-layer comprising about 0.5-20 nm thick of ALD deposited $AlO_x$ and a second sub-layer on top comprising about 0.5-20 nm thick layer of CVD deposited $SiN_x$.

In an exemplary embodiment, dielectric layers may also be deposited on pixels walls in a TIR-based image display by one or more of methods sputtering, ALD, MLD, MVD, PEALD, CVD, PECVD, spin coating or slot die coating.

In an exemplary embodiment, any of the metal oxide, metal nitride, metal sulfide, metal carbide, metal fluoride, polymeric or biomaterial-based dielectric materials that may be deposited by one or methods of sputtering, ALD, MLD, MVD, PEALD, CVD, PECVD, spin coating or slot die coating may further comprise a surface modification layer. The surface modification layer may be deposited by a variety of methods such as wet deposition method, spin coating, slot die coating, dry deposition method, vapor deposition, MVD, ALD, MLD, PEALD, CVD or PECVD. The surface modification layer may comprise a silane-based material. The silane-based material may comprise one or more of a hydrocarbon chain, fluorocarbon chain, amino group, ammonium group, chlorine, bromine, phosphoric acid group, carboxylate group, phenyl group, hydroxyl group, acrylate, methacrylate or an alkoxy group such as a methoxy or ethoxy group. The silane-based material may comprise one or more of 3-(trimethoxysilyl)propyl methacrylate, 1H,1H,2H,2H-Perfluorododecyltrichlorosilane, trichlorododecylsilane, hexadecyltrimethoxysilane, octadecyldimethyl (3-trimethoxysilylpropyl)ammonium chloride, N-trimethoxysilylpropyl-N,N,N-trimethylammonium chloride, carboxyethylsilanetriol-disodium salt, phosphoric acid 2-hydroxyethyl methacrylate ester, nonafluorohexyltrimethoxysilane, 2-phenylethyltrimethoxysilane or hexamethyldisilazane. In an exemplary embodiment, the silane-based material may comprise one or both of a positively charged group or a negatively charged group.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane.

In the exemplary display embodiments described herein, they may be used IoT and non-IoT applications such as in, but not limited to, electronic book readers, portable computers, tablet computers, cellular telephones, smart cards, signs, watches, wearables, military display applications, automotive displays, automotive license plates, shelf labels, flash drives and outdoor billboards or outdoor signs comprising a display. The displays may be powered by one or more of a battery, solar cell, wind, electrical generator, electrical outlet, AC power, DC power or other means.

The following non-limiting exemplary embodiments are provided to further illustrate different aspect of the disclosed embodiments.

Example 1 is directed to a method to form a Total Internal Reflection (TIR) display, the method comprising: forming a transparent front sheet having a plurality of convex protrusions; conformally forming a front electrode over the transparent front sheet; conformally forming a seed layer over the front electrode, the seed layer having a substantially uniform thickness of about 0.5-100 nm; conformally forming a dielectric layer over the seed layer, the dielectric layer having a substantially uniform thickness in the range of about 1-20 nm; and forming a rear electrode proximal to the dielectric layer; wherein the rear electrode and the dielectric layer form a gap therebetween.

Example 2 is directed to the method of example 1, wherein at least one convex protrusion defines a hemispherical protrusion.

Example 3. is directed to the method of example 1, wherein the seed layer comprises aluminum dioxide ($AlO_x$), wherein x is between about 1 and 3, and wherein the seed layer comprises a thickness of about 1-10 nm.

Example 4 is directed to the method of example 1, wherein the front electrode comprises Indium Tin Oxide (ITO).

Example 5 is directed to the method of example 1, wherein the front electrode comprises one or more inorganic dielectric layers, one or more organic dielectric layers or a combination of one or more inorganic dielectric layers and one or more organic dielectric layers.

Example 6 is directed to the method of example 1, wherein the step of forming a dielectric layer over the seed layer further comprises forming a dielectric layer comprising $SiO_2$ having a thickness of at least about 0.05 nm.

Example 7 is directed to the method of example 1, wherein the step of forming a dielectric layer over the seed layer further comprises forming a dielectric layer of $SiO_2$ having thickness of about one atomic layer.

Example 8 is directed to the method of example 1, wherein the seed layer comprises $AlO_x$ of up to about 10 nm thickness and wherein the dielectric layer comprises $SiO_2$ of thickness of up to 20 nm.

Example 9 is directed to the method of example 1, wherein the dielectric layer comprises one or more of $Si3N4$, $SiO2$, $SiN$, $SiN_x$, $SiON$, $AlO_x$, $Al2O3$ or ceramic, wherein x is between about 1 and 3.

Example 10 is directed to the method of example 1, wherein the step of forming a dielectric layer further comprises one of atomic layer deposition (ALD), plasma enhanced atomic layer deposition (PEALD), atomic layer epitaxy (ALE), atomic layer growth (ALG), molecular layer epitaxy (MLE), molecular layering (ML), atomic layer CVD (ALCVD) and molecular vapor deposition (MVD).

Example 11 is directed to a Total Internal Reflection (TIR) display, comprising: a transparent front sheet having a plurality of convex protrusions; a front electrode formed over the transparent front sheet; a dielectric layer formed over the seed layer, the dielectric layer having a substantially uniform thickness in the range of about 1-20 nm; a rear electrode positioned proximal to the dielectric layer, wherein the rear electrode and the dielectric layer form a gap therebetween; and a plurality of electrophoretic particles disposed in the gap.

Example 12 is directed to the TIR display of example 11, further comprising a seed layer formed over the front electrode, the seed layer having a substantially uniform thickness of about 0.5-100 nm.

Example 13 is directed to the TIR display of example 12, wherein at least one convex protrusion defines a hemispherical protrusion.

Example 14 is directed to the TIR display of example 12, wherein the seed layer comprises aluminum dioxide ($AlO_x$), wherein x is between about 1 and 3, and wherein the $AlO_x$ has a thickness of about 1-10 nm.

Example 15 is directed to the TIR display of example 12, wherein the front electrode comprises Indium Tin Oxide (ITO).

Example 16 is directed to the TIR display of example 12, wherein the front electrode comprises one or more inorganic dielectric layers, one or more organic dielectric layers or a combination of one or more inorganic dielectric layers and one or more organic dielectric layers.

Example 17 is directed to the TIR display of example 12, wherein the dielectric layer further comprises $SiO2$ having a thickness of at least about 0.05 nm.

Example 18 is directed to the TIR display of example 12, wherein the dielectric layer further comprises $SiO2$ having thickness of about one atomic layer.

Example 19 is directed to the TIR display of example 12, wherein the seed layer comprises $AlO_x$, wherein x is between about 1 and 3, and wherein the seed layer is up to about 10 nm thickness and wherein the dielectric layer comprises $SiO2$ of thickness of up to 20 nm.

Example 20 is directed to the TIR display of example 12, wherein the dielectric layer comprises one or more of $Si3N4$, $SiO2$, $SiN$, $SiN_x$, $SiON$, $AlO_x$, $Al2O3$ or ceramic, and wherein x is between about 1 and 3.

While the principles of the disclosure have been illustrated in relation to the exemplary embodiments shown herein, the principles of the disclosure are not limited thereto and include any modification, variation or permutation thereof.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method to form a Total Internal Reflection (TIR) display, the method comprising:
   forming a transparent front sheet having a plurality of convex protrusions; conformally forming a front electrode over the transparent front sheet;
   conformally forming a seed layer over the front electrode, the seed layer having a substantially uniform thickness ranging between 0.5-100 nm;
   conformally forming a dielectric layer of $SiO_2$ having thickness of about one atomic layer over the seed layer; and
   forming a rear electrode proximal to the dielectric layer, wherein the rear electrode and the dielectric layer form a gap therebetween.

2. The method of claim 1, wherein at least one convex protrusion defines a hemispherical protrusion.

3. The method of claim 1, wherein the seed layer comprises aluminum dioxide ($AlO_x$), wherein x is between about 1 and 3, and wherein the seed layer comprises a thickness of about 1-10 nm.

4. The method of claim 1, wherein the front electrode comprises Indium Tin Oxide (ITO).

5. The method of claim 1, wherein the front electrode comprises one or more inorganic dielectric layers, one or more organic dielectric layers or a combination of one or more inorganic dielectric layers and one or more organic dielectric layers.

6. The method of claim 1, wherein the step of forming a dielectric layer over the seed layer further comprises forming a dielectric layer comprising $SiO_2$ having a thickness of at least about 0.05 nm.

7. The method of claim 1, wherein the seed layer comprises $AlO_x$ of up to about 10 nm thickness and wherein the dielectric layer comprises $SiO_2$ of thickness of up to 20 nm.

8. The method of claim 1, wherein the dielectric layer comprises one or more of $Si_3N_4$, $SiO_2$, SiN, $SiN_x$, SiON, $AlO_x$, $Al_2O_3$ or ceramic, wherein x is between about 1 and 3.

9. The method of claim 1, wherein the step of forming a dielectric layer further comprises one of atomic layer deposition (ALD), plasma enhanced atomic layer deposition (PEALD), atomic layer epitaxy (ALE), atomic layer growth (ALG), molecular layer epitaxy (MLE), molecular layering (ML), atomic layer CVD (ALCVD) and molecular vapor deposition (MVD).

10. A Total Internal Reflection (TIR) display, comprising:
    a transparent front sheet having a plurality of convex protrusions;
    a front electrode formed over the transparent front sheet;
    a dielectric layer formed over a seed layer, the dielectric layer comprising $SiO_2$ having thickness of about one atomic layer;
    a rear electrode positioned proximal to the dielectric layer, wherein the rear electrode and the dielectric layer form a gap therebetween; and
    a plurality of electrophoretic particles disposed in the gap.

11. The TIR display of claim 10, wherein the seed layer is formed over the front electrode, the seed layer having a substantially uniform thickness of about 0.5-100 nm.

12. The TIR display of claim 11, wherein at least one convex protrusion defines a hemispherical protrusion.

13. The TIR display of claim 11, wherein the seed layer comprises aluminum dioxide ($AlO_x$) wherein x is between about 1 and 3, and wherein the $AlO_x$ has a thickness of about 1-10 nm.

14. The TIR display of claim 11, wherein the front electrode comprises Indium Tin Oxide (ITO).

15. The TIR display of claim 11, wherein the front electrode comprises one or more inorganic dielectric layers, one or more organic dielectric layers or a combination of one or more inorganic dielectric layers and one or more organic dielectric layers.

16. The TIR display of claim 11, wherein the dielectric layer further comprises $SiO_2$ having a thickness of at least about 0.05 nm.

17. The TIR display of claim 11, wherein the seed layer comprises $AlO_x$, wherein x is between about 1 and 3, and wherein the seed layer is up to about 10 nm thickness and wherein the dielectric layer comprises $SiO_2$ of thickness of up to 20 nm.

18. The TIR display of claim 11, wherein the dielectric layer comprises one or more of $Si_3N_4$, $SiO_2$, SiN, $SiN_x$, SiON, $AlO_x$, $Al_2O_3$ or ceramic, and wherein x is between about 1 and 3.

* * * * *